United States Patent [19]

Mingers et al.

[11] Patent Number: 4,656,709

[45] Date of Patent: Apr. 14, 1987

[54] FLOATING ROLL CAPABLE OF ACTING IN TWO OPPOSITE DIRECTIONS

[75] Inventors: Peter-Friedel Mingers, Willich; Karl-Heinz Kusters, Krefeld-Forstwald, both of Fed. Rep. of Germany

[73] Assignee: Eduard Küsters, Krefeld, Fed. Rep. of Germany

[21] Appl. No.: 804,287

[22] Filed: Dec. 3, 1985

[30] Foreign Application Priority Data

Dec. 15, 1984 [DE] Fed. Rep. of Germany ....... 3445890

[51] Int. Cl.$^4$ .................... B21B 13/02; B21B 31/32
[52] U.S. Cl. .................... 29/113 R; 29/116 R; 29/123; 29/129.5; 277/3; 277/27; 277/75; 277/152
[58] Field of Search ......... 29/113 R, 113 AD, 116 R, 29/116 AD, 129.5, 123, 463; 277/3, 27, 75, 152

[56] References Cited

U.S. PATENT DOCUMENTS

| | | | |
|---|---|---|---|
| 4,089,094 | 5/1978 | Kaira | 29/116 AD |
| 4,187,594 | 2/1980 | Appenzeller | 29/116 AD |
| 4,373,238 | 2/1983 | Güttinger | 29/113 AD |
| 4,447,940 | 5/1984 | Appenzeller et al. | 29/116 AD |
| 4,506,421 | 3/1985 | Appenzeller et al. | 29/113 AD |

FOREIGN PATENT DOCUMENTS

| | | | |
|---|---|---|---|
| 1193739 | 5/1965 | Fed. Rep. of Germany | 29/116 AD |
| 405835 | 2/1965 | Japan | 29/116 AD |

Primary Examiner—Howard N. Goldberg
Assistant Examiner—Irene Graves Golabi
Attorney, Agent, or Firm—Kenyon & Kenyon

[57] ABSTRACT

A floating roll with longitudinal chambers formed in a space between a hollow shell and a cross piece, of which one chamber is the pressure-effective longitudinal chamber, on which the hollow roll is braced via a pressure liquid, has strip-shaped longitudinal seals provided in duplicate and disposed symmetrically relative to the meridian plane separating the longitudinal chambers so that each of the longitudinal chambers can be sealed against the higher liquid pressure and the cross piece need not be turned around for a change in the direction of action.

17 Claims, 1 Drawing Figure

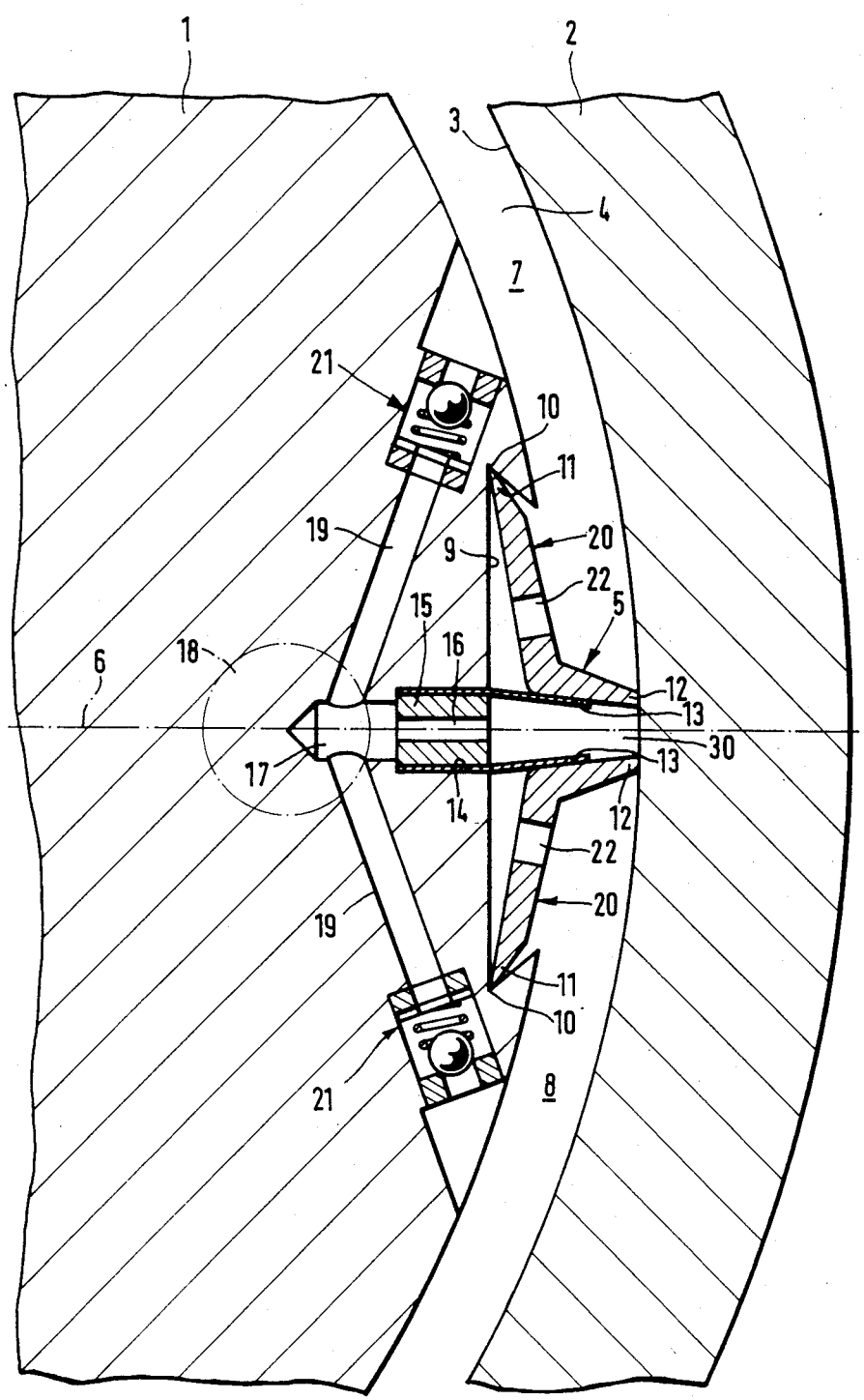

FLOATING ROLL CAPABLE OF ACTING IN TWO OPPOSITE DIRECTIONS

BACKGROUND OF THE INVENTION

This invention relates to a roll of the type which has a hollow shell with a cross piece extending through the shell with a spacing and pressure chambers formed by seals in the space between the shell and cross piece in general, and more particularly to an improved sealing arrangement in such a roll, to permit it act in two opposite directions.

A roll with a revolving hollow shell forming the working roll circumference, a stationary cross piece extending through the shell lengthwise with a spacing from the inside circumference of the hollow roll all around, with ends extending from the shell, the cross piece adapted for the application of external forces to ends protruding from the hollow shell, means forming longitudinal chambers in the space between the hollow shell and the cross piece, and means supplying a pressure fluid to one of the longitudinal chambers so that the hollow shell is braced via the pressure liquid, is known in the art. A roll of this type in which the longitudinal chambers comprises a sealing arrangement mounted to the cross piece including transverse end seals disposed at the mutually opposite ends of the longitudinal chambers along the cross piece and the hollow shell, and strip-shaped longitudinal seal extending along the cross piece and the hollow shell, on both sides of the action plane of the roll, each longitudinal seal having a longitudinal edge engaging a longitudinal undercut at the cross piece and resting with its other longitudinal edge against the inside circumference of the hollow shell and directed at an angle toward the pressurized longitudinal chamber is described in German Pat. No. 11 93 739. By means of the longitudinal seals, a first longitudinal chamber situated on the side of the roll gap and a second chamber situated away from the first chamber are divided off. In the first longitudinal chamber, the hydraulic pressure responsible for generating the line pressure acts in the roll gap. Leakage oil passes into the second longitudinal chamber and is conducted off from there. In general, however, this second longitudinal chamber is not completely without pressure, but is also filled with pressure liquid and has a certain pressure which counteracts the pressure in the first longitudinal chamber situated on the side of the roll gap. Only the excess pressure in the first longitudinal chamber is then effective.

In the design of the longitudinal seals just described, it is predetermined which of the two longitudinal chambers must be the one with the higher pressure. The longitudinal seal is formed by a sealing strip which extends from the undercut in the cross piece outwardly at an angle toward the inside circumference of the hollow roll and must be directed toward the longitudinal chamber with the higher pressure so that the pressure acts against the "underside" of the sealing strip and presses the sealing strip against the inside circumference of the hollow shell with a sealing pressure which is the higher, the higher the pressure in the first longitudinal chamber. Hereinafter, the chamber with the higher pressure will be called the "pressure-effective" longitudinal chamber.

An asymmetry of the seal design, therefore, exists with respect to the meridian plane of the roll perpendicular to the action plane, which made it necessary heretofore to turn the cross piece 180° C. if such a roll is to act upwardly, for instance, instead of downwardly. Cases in which such changes in the direction of action occur can happen in rolling arrangements with more than two rolls. For instance, it can become necessary, depending on the desired treatment of a paper web, to direct the preponderant pressure of a roll of the type described above, against the upper roll of a calender instead of against the lower roll.

It is, thus, an object of the present invention to develop a roll of the type described above in such a manner that a change in the direction of action is possible without having to turn the cross piece around.

SUMMARY OF THE INVENTION

According to the present invention, this problem is solved by having each longitudinal seal comprise two sealing strips arranged with mirror symmetry relative to the connecting plane of the longitudinal seals and closely adjacent in the circumferential direction. Means are provided to fill the space between the sealing strip with pressure liquid at a selectable pressure.

By providing two sealing strips for each longitudinal seal with the two seals disposed in a mirror-symmetrical arrangement, the presently existing asymmetry is eliminated and the roll is enabled to function in both directions of action without the necessity of taking measures other than changing the hydraulic pressure in the longitudinal chambers for resetting. The seal is always operative.

The pressure prevailing in the space between the two sealing strips of each seal should be freely selectable. This pressure is responsible for pressing the sealing strips against the inside circumference of the hollow roll and thereby for the sealing action and for the leakage losses from the pressure-effective longitudinal chamber. With greater contact pressure, the friction and the power share required for overcoming it also increase. In general, the pressure in the space between the sealing strips will be chosen in such a manner as to obtain a compromise between leakage and power losses.

In particular, the pressure can follow the pressure in the pressure-effective longitudinal chamber. In other words, the pressure in the space between the sealing strips should rise and fall when the pressure in the pressure-effective longitudinal chamber rises or falls. The "tracking" need not necessarily be proportional; only, a dependence in the same sense need exist which is either controlled from the outside or is obtained by a connection between the pressure-effective longitudinal chamber and the space between the sealing strips.

The undercuts supporting the sealing strips are advantageously designed as a dove-tail longitudinal recess. The longitudinal recess is in the vicinity of the neutral zone of the cross piece and weakens the bending strength of the cross piece only insignificantly.

If the sealing strips have an L-shaped cross section as is shown in German Pat. No. 11 93 739, and are always held in contact with the inside circumference of the hollow roll by spring strips, an embodiment in which two spring strips and a holding strip are provided is advantageous in order to accomplish, in a manner as simple as possible, the resilient support of both adjoining sealing strips.

There are two possibilities for feeding the pressure liquid into the space between the sealing strips, whereby the contact pressure of the sealing strips is obtained.

A first possibility of solving this problem comprises feeding a support pressure to the space between the sealing strips from the outside. This should be considered particularly if the presssure must be selectable independently of the presssure in the pressure-effective longitudinal chamber or is made available outside the roll by the pressure supply device of the pressure-effective longitudinal chamber.

Since this solution, however, requires the installation of a separate longitudinal canal in the cross piece, which must generally be made by a deep hole, the use of channels and check valves between the pressure chambers and the space between seals is preferred. Here, only relative short transverse holes are needed which, so to speak, "bridge" the longitudinal seal in the circumferential direction. The check valve located in the connecting canal to the pressure-effective longitudinal chamber opens and communicates this pressure to the space between the sealing strips, while simultaneously, the passage of pressure liquid of this pressure into the other longitudinal chamber is prevented by its check valve, which shuts off in this direction, so that the pressure difference in the longitudinal chamber is preserved in spite of the "bridging."

The last-mentioned solution is not only more economical but is preferably employed particularly if the pressure is to track that of the pressure-effective longitudinal chamber, i.e., is increased accordingly and, for instance, is directly proportional to the chamber pressure or, in an extreme case, is equal thereto. In this embodiment, the pressure of the pressure-effective longitudinal chamber is automatically communicated to the space between the sealing strips and is, of course, increased and decreased with this pressure.

BRIEF DESCRIPTION OF THE DRAWINGS

The single FIGURE a partial cross section through a roll according to the present invention in the vicinity of a longitudinal seal.

DETAILED DESCRIPTION

The roll of the present invention comprises a stationary cross piece 1, about which a hollow shell 2 revolves. The cross piece 1 leaves a space 4 all around from the inside circumference 3 of the hollow shell 2 so that the cross piece can bend within the hollow shell 2 when a load occurs in the roll gap without touching its inside circumference 3.

The forces due to the line pressure in the roll gap are transmitted via a pressure liquid to the cross piece 1 which bends under the action of these forces and generates in this manner the counterforces which bring about an equilibrium. The pressure liquid is contained in a longitudinal chamber which is formed in the space 4 and is divided off by the transverse end seals (not shown) which define the space 4 in the axial direction as well as by longitudinal seals 5 which are arranged on both sides of the cross piece 1. Such a longitudinal seal is located on the left side of the cross piece, according to the drawing. In the illustrated embodiment, the two longitudinal seals 5 lie in a connecting plane 6, which is a meridian plane perpendicular to the plane of action of the roll.

By means of the transverse end seals and the longitudinal seals 5, two longitudinal chamber 7 and 8, both of which can be filled with pressure liquid through feed lines (not shown) are formed.

The longitudinal seal 5 is designed symmetrically with respect to the connecting plane 6. In the circumferential surface of the cross piece 1, a dove-tail-like longitudinal recess 9 is milled out, the root surface of which is perpendicular to the connecting plane 6. In the re-entrant corners of the dove-tail cross section, undercuts 10 are formed with which one of two sealing strips always engage with one of their longitudinal edges 11. The sealing strips 20 have an approximately L-shaped cross section, and the longitudinal edge 11 is formed at the free end of the longer leg of the "L." The other longitudinal edge 12 of the sealing strips 20 is formed at the free end of the shorter leg of the "L" and rests almost radially against the inside circumference of the hollow roll 2. The sealing strips 20 are arranged symmetrically with respect to the connecting plane 6 and are held in their position resiliently by two spring strips 13. The sealing strips 20 are held in contact against the inside circumference 3. The cross piece is provided in a longitudinal slot 14 in the center of the rooted areas of the longitudinal recess 9 for retaining spring strips 13. Between the spring strips 13, a holding strip 15 is arranged which keeps the spring strips 13 spaced and in the slot 14. The holding strip 15 has bores 16 which are distributed over its length and establish a connection from a space 30 between the sealing strips 20 to a short radial bore 17 in the cross piece 1. This radial bore 17 can open into a longitudinal canal 18, shown only dashed, of the cross piece 1, through which pressure liquid of controllable pressure can be supplied for transfer into the interspace 30. In the other, preferred, embodiment shown by solid lines, two inclined holes 19 lead from bore 17 into the longitudinal chambers 7 and 8. A check valve 21 is placed in each hole 19. The check valves 21 shut off in a direction toward each respective longitudinal chamber.

Sealing strips 20 consist of a suitable bronze alloy which, with the steel of the inside circumference 3 of the hollow shell 2, forms an advantageous sliding pairing.

The arrangement operates as follows:

If the roll is to exert, as shown in the drawing, a line pressure acting upwards or a higher line pressure upwards than downwards, pressure liquid is fed to the longitudinal chamber 7 through the feed line, not shown, under an appropriate hydraulic pressure, while the longitudinal chamber 8 carries no hydraulic pressure or only a small hydraulic pressure. In any event, the hydraulic pressure prevailing in the longitudinal chamber 7 acts on the sealing strip 20, which is the upper one in the drawing, in such a manner that it is lifted off the inside circumference 3 of the hollow roll 2. Even if pressure liquid gets to the rear of the upper sealing strip 20 through the holes 22 in the longer leg of the "L" and thereby a certain amount of pressure equalization takes place, a certain amount of sealing is provided because the spring strip 13 rests against the underside of the shorter leg of the "L" and thereby the action area of the pressure prevailing in the longitudinal chamber 7 is greater on the top side of the upper sealing strip 20 than on the underside. It should be noted that the spring strips 13 and the holding strip 15 as well as the sealing strips 20 extend without interruption over the entire length of the longitudinal chambers 7 and 8.

If, therefore, the upper longitudinal chamber 7 is the "pressure-effective" longitudinal chamber, then the lower sealing strip 20 in the drawing is the "active" sealing strip. Care must be taken that it is pressed onto the longitudinal edge 12 and the inside circumference 3 of the hollow shell 2 the more firmly, the higher the pressure in the longitudinal chamber 7 becomes. For this purpose, there is generated in the space 30 between the sealing strips 20, a pressure which increases with the pressure in the longitudinal chamber 7 and, in the arrangement shown, allows the lower sealing strip 20 to tilt clockwise about its longitudinal edge 11 in the undercut 10 and thereby presses on the lower sealing strip 20 correspondingly more firmly. The pressure in the space 30 to a certain extent also benefits the upper sealing strip 20 which thereby makes a preliminary seal. The pressure liquid for the space 30, which is at the desired pressure, can be brought up through the line 18 or be taken directly from the longitudinal chamber 7 via the inclined hole 19. The check valve mounted in the longitudinal chamber 7 opens if there is flow from the longitudinal chamber 7 into the space 30. The lower check valve 21 mounted at the longitudinal chamber 8, on the other hand, shuts off against the passage of pressure liquid from the longitudinal chamber 7, which is at a higher pressure, into the longitudinal chamber 8.

If now, however, the roll is to act downwardly and have the higher pressure in the longitudinal chamber 8, what was said above applies similarly, since the arrangement is of symmetrical design. The longitudinal seal, therefore, functions regardless of whether the upper longitudinal chamber 7 or the lower longitudinal chamber 8 is to be the "pressure-effective" longitudinal chamber. There is no longer a need for changing the position of the cross piece 1 for such a reversal between the longitudinal chambers.

What is claimed is:

1. In a roll comprising: a revolving hollow shell forming the working roll circumference; a stationary cross piece extending through the shell lengthwise with a spacing from the inside circumference of the hollow roll all around, with ends extending from the shell, said ends protruding from the hollow shell adapted for the application of the external forces; means forming longitudinal chambers in the space between the hollow shell and the cross piece; means supplying a pressure fluid to one of said longitudinal chambers, so that the hollow shell is braced via the pressure liquid; said means forming longitudinal chambers in the space between comprising a sealing arrangement mounted to the cross piece including transverse end seals disposed at the mutually opposite ends of the longitudinal chambers along the cross piece and the hollow roll, and strip-shaped longitudinal seals extending along the cross piece and the hollow roll, on both sides of the action plane of the roll, each longitudinal seal having a longitudinal edge engaging a longitudinal undercut at the cross piece and resting with its other longitudinal edge against the inside circumference of the hollow roll and directed at an angle toward the pressurized longitudinal chamber, the improvement comprising: each longitudinal seal comprising two sealing strips arranged with mirror symmetry relative to the connecting plane of the longitudinal seals and closely adjacent in the circumferential direction; and means to fill the space between the sealing strips with pressure liquid at a selectable pressure.

2. A roll according to claim 1, comprising means to fill said space with pressure liquid at a pressure which can be tracked to the pressure in the longitudinal chamber having the higher pressure.

3. A roll according to claim 2, wherein undercuts for the respectively associated sealing strips of one side of the cross piece are formed by a dove-tailed-like longitudinal recess therein.

4. A roll according to claim 3, wherein said sealing strips have an L-shaped cross section with a longer leg and a shorter leg, the longer leg braced in the undercut and the shorter leg resting against the inside circumference of the hollow roll and further including a spring strip fastened in a longitudinal slot in the cross piece, extending radially and acting against the outside of the shorter leg, holding it in contact against the inside circumference of the hollow shell, said improvement further comprising, two spring strips held spaced by a holding strip arranged in between and disposed in the longitudinal slot.

5. A roll according to claim 4, wherein said means to fill comprise a connecting canal connecting the space between the associated sealing strips of one side of the cross piece with a feed canal for pressure liquid in the cross piece.

6. A roll according to claim 4, wherein said means to fill comprise a connecting canal connecting the space between the associated sealing strips of one side of the cross piece to each of the two longitudinal chambers and a check valve arranged in each of said connecting canals.

7. A roll according to claim 1, wherein undercuts for the respectively associated sealing strips of one side of the cross piece are formed by a dove-tailed-like longitudinal recess therein.

8. A roll according to claim 7, wherein said sealing strips have an L-shaped cross section with a longer leg and a shorter leg, the longer leg braced in the undercut and the shorter leg resting against the inside circumference of the hollow roll and further including a spring strip fastened in a longitudinal slot in the cross piece, extending radially and acting against the outside of the shorter leg, holding it in contact against the inside circumference of the hollow shell, said improvement further comprising, two spring strips held spaced by a holding strip arranged in between and disposed in the longitudinal slot.

9. A roll according to claim 1, wherein said sealing strips have an L-shaped cross section with a longer leg and a shorter leg, the longer leg braced in the undercut and the shorter leg resting against the inside circumference of the hollow roll and further including a spring strip fastened in a longitudinal slot in the cross piece, extending radially and acting against the outside of the shorter leg, holding it in contact against the inside circumference of the hollow shell, said improvement further comprising, two spring strips held spaced by a holding strip arranged in between and disposed in the longitudinal slot.

10. A roll according to claim 9, wherein said means to fill comprise a connecting canal connecting the space between the associated sealing strips of one side of the cross piece with a feed canal for pressure liquid in the cross piece.

11. A roll according to claim 7, wherein said means to fill comprise a connecting canal connecting the space between the associated sealing strips of one side of the cross piece with a feed canal for pressure liquid in the cross piece.

12. A roll according to claim 3, wherein said means to fill comprise a connecting canal connecting the space between the associated sealing strips of one side of the cross piece with a feed canal for pressure liquid in the cross piece.

13. A roll according to claim 1, wherein said means to fill comprise a connecting canal connecting the space between the associated sealing strips of one side of the cross piece with a feed canal for pressure liquid in the cross piece.

14. A roll according to claim 9, wherein said means to fill comprise a connecting canal connecting the space between the associated sealing strips of one side of the cross piece to each of the two longitudinal chambers and a check valve arranged in each of said connecting canals.

15. A roll according to claim 7, wherein said means to fill comprise a connecting canal connecting the space between the associated sealing strips of one side of the cross piece to each of the two longitudinal chambers and a check valve arranged in each of said connecting canals.

16. A roll according to claim 3, wherein said means to fill comprise a connecting canal connecting the space between the associated sealing strips of one side of the cross piece to each of the two longitudinal chambers and a check valve arranged in each of said connecting canals.

17. A roll according to claim 1, wherein said means to fill comprise a connecting canal connecting the space between the associated sealing strips of one side of the cross piece to each of the two longitudinal chambers and a check valve arranged in each of said connecting canals.

* * * * *

UNITED STATES PATENT AND TRADEMARK OFFICE
CERTIFICATE OF CORRECTION

PATENT NO. : 4,656,709

DATED : April 14, 1987

INVENTOR(S) : Peter-Friedel Mingers, Karl-Heinz Kusters

It is certified that error appears in the above-identified patent and that said Letters Patent is hereby corrected as shown below:

Column 5, line 2, insert --and-- after "2" and --pressure is applied-- after "firmly".

Signed and Sealed this

Thirteenth Day of October, 1987

Attest:

DONALD J. QUIGG

Attesting Officer

Commissioner of Patents and Trademarks